US008006115B2

(12) United States Patent
Fischer et al.

(10) Patent No.: US 8,006,115 B2
(45) Date of Patent: *Aug. 23, 2011

(54) CENTRAL PROCESSING UNIT WITH MULTIPLE CLOCK ZONES AND OPERATING METHOD

(75) Inventors: Timothy C. Fischer, Berthoud, CO (US); Samuel Naffziger, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2060 days.

This patent is subject to a terminal disclaimer.

(21) Appl. No.: 10/679,725

(22) Filed: Oct. 6, 2003

(65) Prior Publication Data

US 2005/0076257 A1 Apr. 7, 2005

(51) Int. Cl.
*G06F 1/04* (2006.01)
(52) U.S. Cl. .................. 713/501; 713/400; 713/600
(58) Field of Classification Search .................. 713/322, 713/400–501, 503, 600
See application file for complete search history.

(56) References Cited

U.S. PATENT DOCUMENTS

| 5,309,561 | A | | 5/1994 | Overhouse et al. |
| 5,434,996 | A | * | 7/1995 | Bell .............................. 713/400 |
| 5,539,345 | A | * | 7/1996 | Hawkins ....................... 327/150 |
| 5,565,816 | A | | 10/1996 | Coteus et al. |
| 6,047,248 | A | * | 4/2000 | Georgiou et al. ............. 702/132 |
| 6,323,714 | B1 | | 11/2001 | Naffziger et al. |
| 6,429,714 | B1 | | 8/2002 | Schultz |
| 6,720,673 | B2 | * | 4/2004 | Blanco et al. ................... 307/64 |
| 6,820,240 | B2 | * | 11/2004 | Bednar et al. ..................... 716/1 |
| 2002/0038435 | A1 | | 3/2002 | Akamatsu et al. |
| 2002/0040443 | A1 | | 4/2002 | Maeda et al. |
| 2002/0104032 | A1 | | 8/2002 | Khurshid et al. |
| 2003/0112038 | A1 | | 6/2003 | Naffziger et al. |

FOREIGN PATENT DOCUMENTS

EP 0 478 132 4/1992
JP 11219237 8/1999

OTHER PUBLICATIONS

U.S. Appl. No. 10/679,786, Fisher et al.
Foreign Search Report issued for GB 0 42 1932.5, dated Jan. 16, 2005.
French Search Report issued for FR 0407296 dated Nov. 14, 2005.
France Preliminary Search Report, dated Nov. 14, 2005, 3 pages.
Japan Office Action, not translated, dated Dec. 26, 2006, 2 pages.
Japan Final Rejection, not translated, dated May 21, 2007, 2 pages.
Notice of Allowance, dated Mar. 20, 2006, U.S. Appl. No. 10/679,786, 8 pages.
UK Search Report dated Jan. 27, 2005, 4 pages.
German Office Action, not translated, dated May 11, 2007, 3 pages.

* cited by examiner

*Primary Examiner* — Dennis M Butler

(57) ABSTRACT

One embodiment of the invention comprises, in each clock zone of a central processing unit, at least one sensor that generates a power signal indicative of a power supply voltage within the clock zone, a clock generator for providing a variable frequency clock to the clock zone, and a controller for controlling an operating frequency of the clock generator in response to the power signal and in response to frequency adjustment communications from other clock zones.

19 Claims, 3 Drawing Sheets

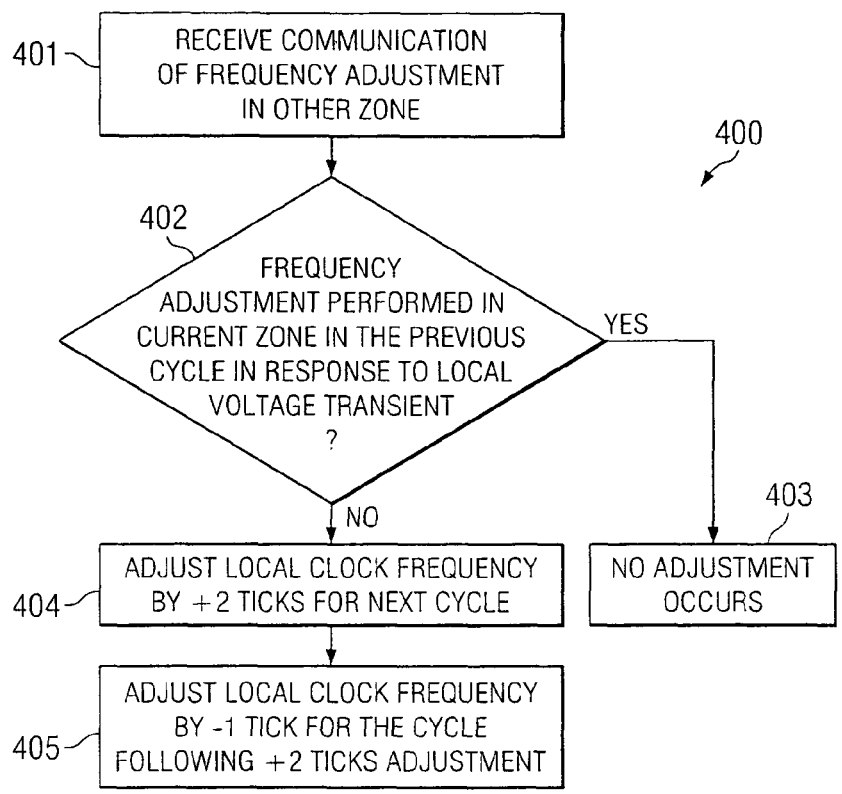
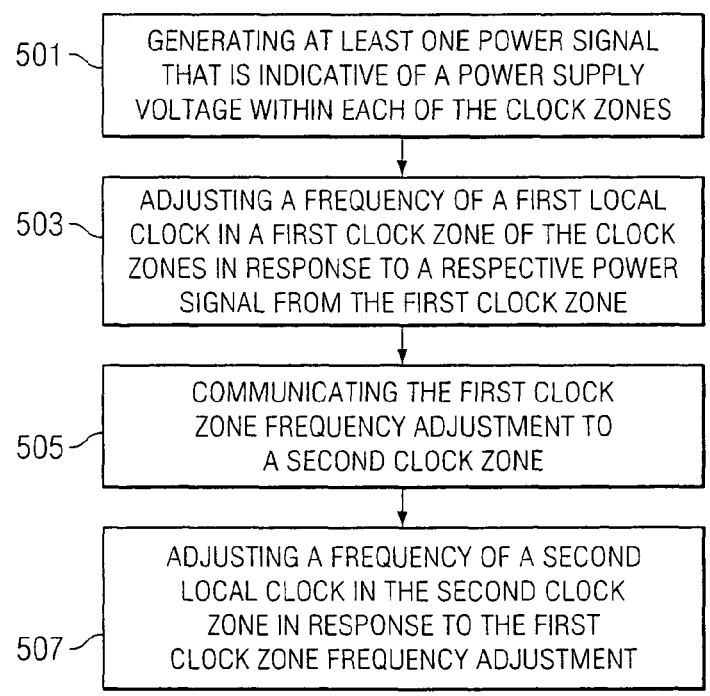

CENTRAL PROCESSING UNIT WITH MULTIPLE CLOCK ZONES AND OPERATING METHOD

RELATED APPLICATIONS

The present application is related to concurrently filed and commonly assigned U.S. patent application Ser. No. 10/679,786, entitled "SYSTEMS AND METHODS FOR SYNCHRONIZING MULTIPLE VARIABLE FREQUENCY CLOCK GENERATORS," which is incorporated herein by reference.

BACKGROUND

In a central processing unit (CPU), the operations of various logical components are controlled by a system clock which is generally generated utilizing a phase-lock loop (PLL). The operations of the various logical components are interrelated and, hence, various circuit path timing constraints typically exist. The actual timing associated with the circuit paths during operation of the CPU may depend upon the voltage supplied to the various components of the CPU. To ensure that the timing constraints are satisfied and that the CPU operates as expected, the frequency of the system clock may be selected according to worst-case criteria. In a relatively large and complex CPU, the supply voltage supplied to various components of the CPU may vary for a variety of reasons. If the frequency of the system clock is selected according to the worst-case criteria for all of the various components, system performance may be appreciably restricted.

SUMMARY

One embodiment of the invention comprises, in each clock zone of a central processing unit, at least one sensor that generates a power signal indicative of a power supply voltage within the clock zone, a clock generator for providing a variable frequency clock to the clock zone, and a controller for controlling an operating frequency of the clock generator in response to the power signal and in response to frequency adjustment communications from other clock zones.

Another embodiment of the invention comprises, for a central processing unit that comprises multiple clock zones, generating at least one power signal that is indicative of a power supply voltage within each of the clock zones, adjusting a frequency of a first local clock in a first clock zone of the clock zones in response to a respective power signal from the first clock zone, communicating the first clock zone frequency adjustment to a second clock zone, and adjusting a frequency of a second local clock in the second clock zone in response to the first clock zone frequency adjustment.

Another embodiment of the invention comprises, in each clock zone of a central processing unit, means for generating a power signal that is indicative of a power supply voltage within the clock zone, and means for modifying a frequency of a respective variable frequency clock in response to the power signal and in response to frequency adjustment communications from other clock zones.

BRIEF DESCRIPTION OF THE DRAWINGS

FIG. 4 depicts another process flow for operating a phase controller according to one representative embodiment.

FIG. 5 depicts a method of operation a CPU that includes multiple clock zones.

DETAILED DESCRIPTION

Figure 1:
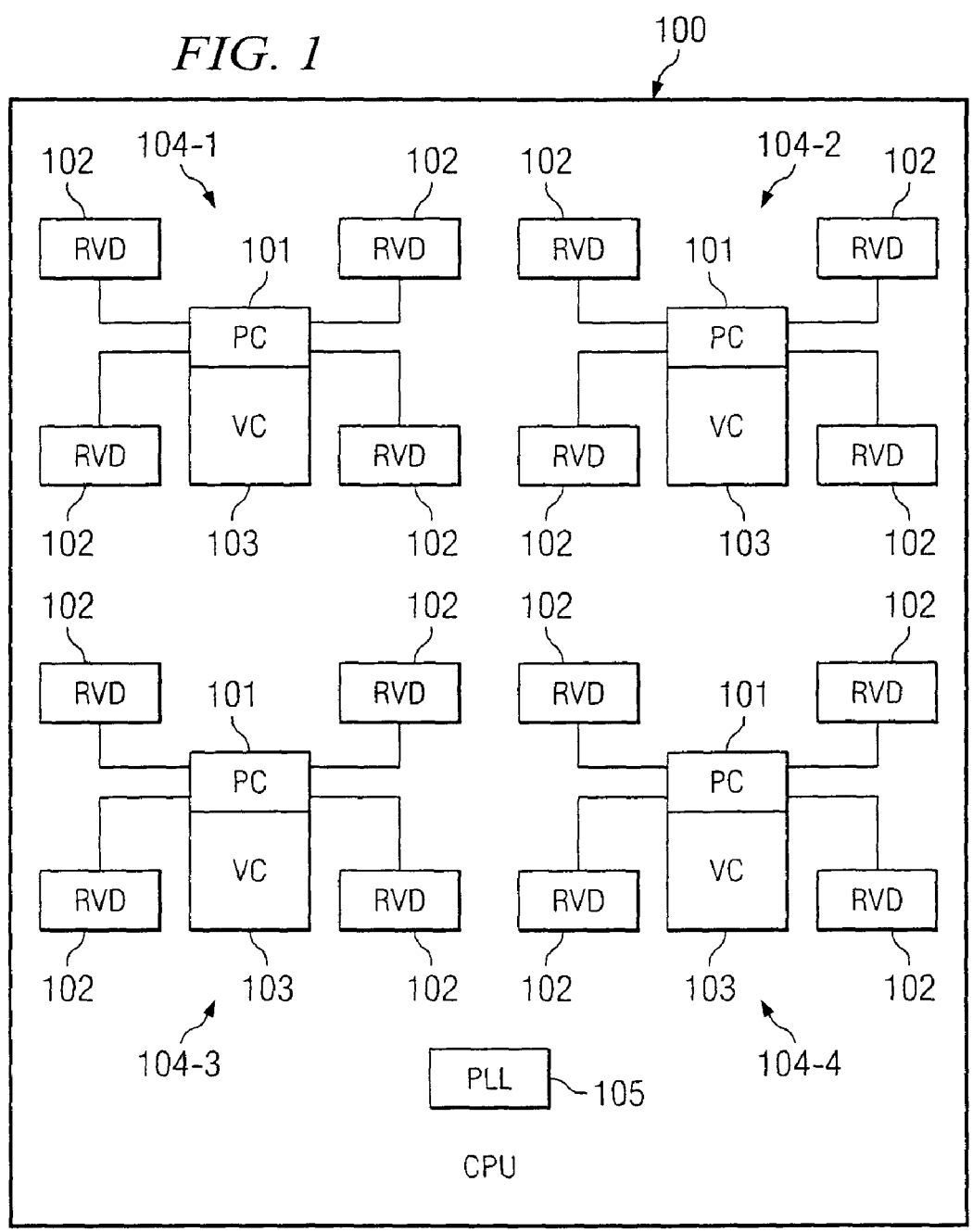
FIG. 1 depicts a central processing unit (CPU) with multiple clock zones according to one representative embodiment.

FIG. 1 depicts CPU 100 at a relatively high level according to one representative embodiment. CPU 100 may contain, as is well known, a large number of functional blocks and components (which are not shown). CPU 100 includes structure for providing respective clocks to functional blocks and components according to a plurality of zones (shown as 104-1 through 104-4). Zones 104-1 through 104-4 are separated from each other by one or more cycles of communication latency.

Each zone includes a respective variable clock generator 103. Variable clock generators 103 generate a local clock for the respective zone that is derived from master phase-locked loop (PLL) 105. In one representative embodiment, variable clock generators 103 may possess a limited capability of changing the frequency of the local clock within a single cycle. For example, variable clock generators 103 may be limited to adjusting their frequencies by changing the periods of their clocks by −1 "tick,"+1 "tick", and +2 "ticks", where a "tick" is a suitable fraction (e.g., 1/64) of the period of the input clock from master PLL 105.

Each phase controller 101 receives input signals from one or several regional voltage detectors 102 (or, alternatively, thermal sensors) to control variable clock generators 103. Specifically, each regional voltage detector 102 monitors the voltage of the CPU power supply within its localized area to detect when the voltage crosses a threshold level. Upon such detection, regional voltage detector 102 generates a signal indicative of the voltage condition for communication to phase controller 101. Phase controller 101, in turn, provides a suitable signal to variable clock generator 103 to modify its frequency.

When one of phase controllers 101 causes the frequency of the local clock within its zone to be changed, the respective phase controller 101 communicates this information to other phase controllers 104. For example, phase controller 101 of zone 104-1 communicates its clock frequency adjustments to phase controllers 101 of zones 104-2 through 104-4. The communication of the frequency adjustment may occur according to one or more cycles of latency. Specifically, the other phase controllers 101 receive the communication of the frequency adjustment during the next clock cycle or another subsequent clock cycle. Because the communication occurs according to one or more cycles of latency, the clocks associated with the phase controllers 101 that received the communication of the clock frequency adjustment are also out-of-phase relative to the clock associated with the frequency adjustment. To compensate for the phase misalignment, the responding phase controllers 101 temporarily adjust the frequency of their clocks beyond the communicated frequency adjustment to drive the phase misalignment to zero. When the phase misalignment is driven to zero, the responding phase controllers 101 cause another frequency adjustment (in the opposite direction) to cause the frequency of its local clock to match the frequency of the clock associated with the original frequency adjustment.

Figure 2:
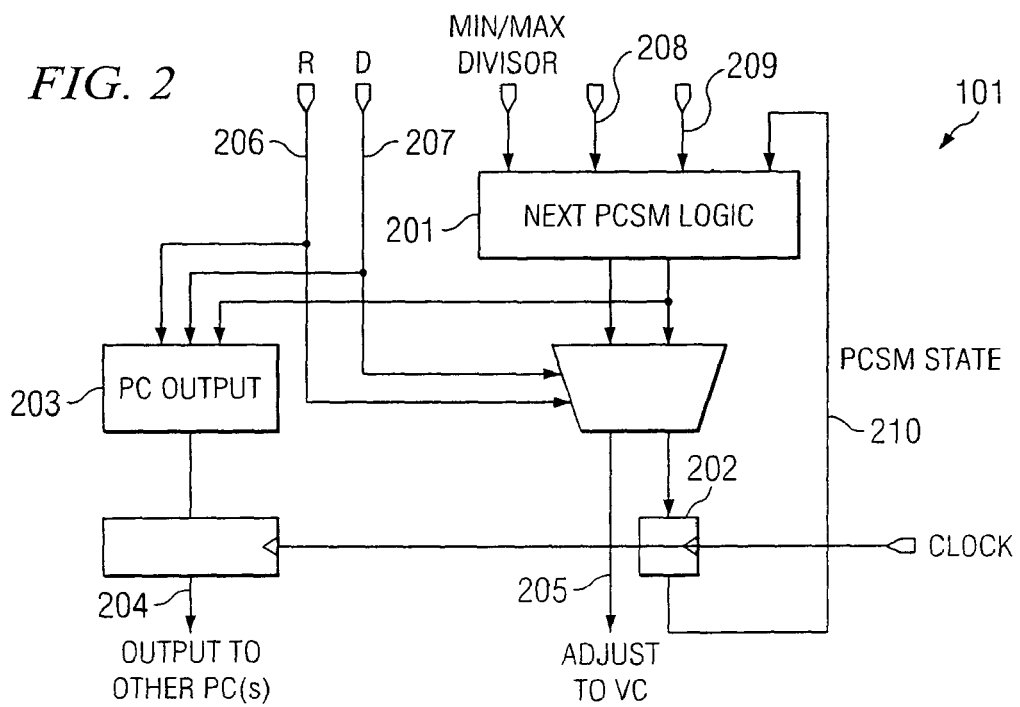
FIG. 2 depicts a phase controller according to one representative embodiment.

FIG. 2 depicts phase controller 101 in greater detail according to one representative embodiment. Phase controller 101 includes next phase controller state machine (PCSM) logic 201. Next PCSM logic 201 is operable to control the state and, hence, the output signals from phase controller 101. Next PCSM logic 201 receives inputs (e.g., "UP" or "DOWN" signals as appropriate) from regional voltage detectors 102 via line 206 (also denoted by "R") to communicate the occurrence of a voltage transient or the like that necessitates a change in clock frequency. Next PCSM logic 201 further receives inputs from other phase controllers 101 via line 207 (also denoted by "D") to enable phase controller 101 to synchronize its clock to adjustments made in clocks in other zones 104. Next PCSM logic 201 further determines the next state of phase controller 101 as a function of the previous state by utilizing latch 202 and line 210. Next PCSM logic 201 may receive inputs from a hierarchical controller (not shown) via lines 208 and 209 as discussed in greater detail in U.S. patent application Ser. No. 10/679,786, entitled "SYSTEMS AND METHODS FOR SYNCHRONIZING MULTIPLE VARIABLE FREQUENCY CLOCK GENERATORS."

Phase controller 201 provides multiple output lines (shown as lines 204 and 205). Line 205 provides an output line from next PCSM logic 201. When next PCSM logic 201 determines that a frequency adjustment is appropriate in response to the various input signals, PCSM logic 201 causes a suitable signal to be communicated via line 205 to variable clock generator 103. In this representative embodiment, PCSM logic 201 communicates a signal to variable clock generator 103 to adjust the period of its clock by −1 tick, +1 tick, and +2 ticks, where a tick is a suitable fraction (e.g., ¹⁄₆₄) of the period of the input clock from master PLL 105. PC output 203 determines when it is appropriate to signal a frequency change via line 204 instituted by phase controller 101 to other phase controllers 101 in other zones 104. For example, if phase controller 101 made a frequency adjustment to synchronize to a prior frequency adjustment that occurred in another zone 104, communication of the frequency adjustment in the current zone 104 is not necessary.

Figure 3:
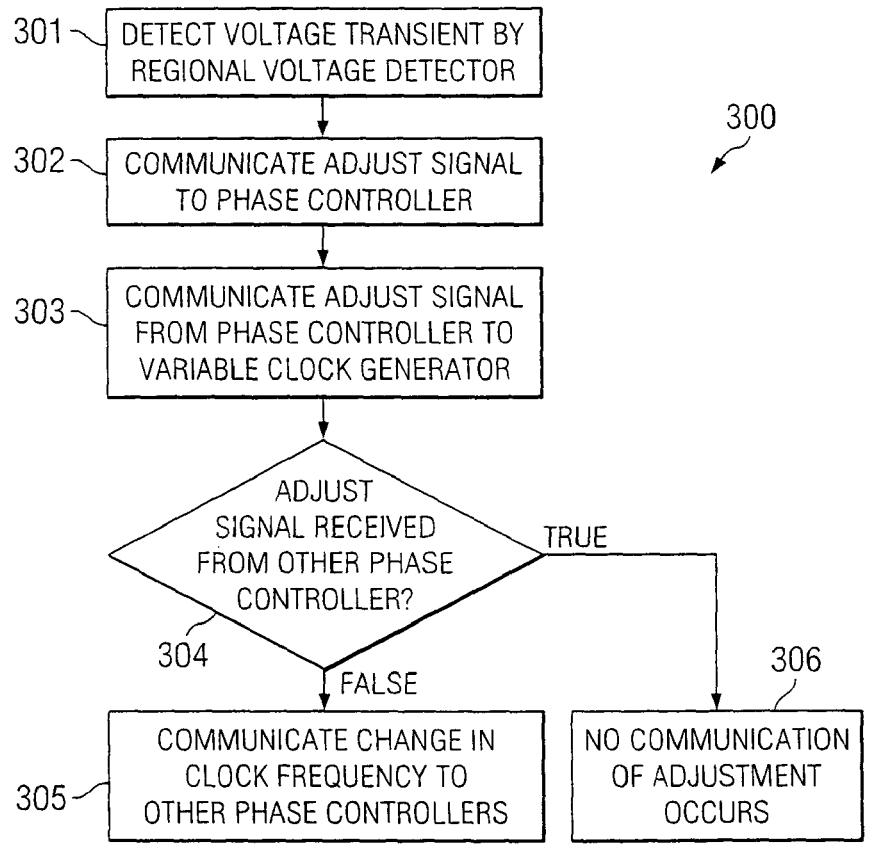
FIG. 3 depicts a process flow for operating a phase controller according to one representative embodiment.

FIG. 3 depicts process flow 300 for operating phase controller 101 according to one representative embodiment. In step 301, a voltage transient is detected by regional voltage detector 102. In step 302, an adjust signal is communicated from the regional voltage detector to phase controller 101. In step 303, phase controller 101 communicates an adjust signal to variable clock generator 103. In step 304, a logical comparison is made to determine whether an adjust signal was received from another phase controller. If so, the process flow proceeds to step 306, where no communication of the local clock adjustment occurs. Specifically, because a clock adjustment has already occurred in another zone 104 and that adjustment has been communicated to cause similar adjustments in other zones 104, it is not necessary for the zone 104 performing the clock adjustment in response to voltage transients to communicate its clock adjustment. If the logical comparison of step 304 is false, the process flow proceeds to step 305 where the clock adjustment is communicated to other phase controllers 101.

FIG. 4 depicts process flow 400 for operating phase controller 101 according to one representative embodiment. In step 401, communication of a frequency adjustment that occurred in another zone is received. In step 402, a logical determination is made to determine whether a frequency adjustment was performed in the current zone in the previous cycle in response to a local voltage transient. If the logical determination of step 402 is true, the process flow proceeds to step 403 where no frequency adjustment is made, because the frequency of the local clock already equals the frequency of the clock associated with the communicated adjustment. If the logical determination of step 402 is false, the process flow proceeds to step 404. In step 404, the frequency of the local clock is varied by changing the period of the local clock by +2 ticks of the period of the clock of master PLL 105. The adjustment by +2 ticks facilitates aligning the phase of the local clocks. Specifically, if an adjustment was made to only synchronize the frequency of the local clock to the frequency of the clock associated with the initial adjustment, the two clocks would be out-of-phase due to the one cycle of communication latency between the respective zones 104. After multiple clock adjustments, the clock skew between zones 104 could cause CPU 100 to malfunction. However, by adjusting by +2 ticks, the local clock temporarily slows relative to the clock associated with the original adjustment thereby causing the phase misalignment to be eliminated. In step 405, another adjustment (i.e., by −1 tick) is made to cause the frequency of the local clock to equal the frequency of the clock associated with the communicated frequency adjustment.

Process flow 300 of FIG. 3 and process flow 400 of FIG. 4 have been depicted as a linear set of operations for the convenience of the reader. However, it shall be appreciated that representative embodiments are not so limited. Some representative embodiments may implement suitable logic to perform selected operations within process flow 300 and/or process flow 400 concurrently. Moreover, selected operations may be performed by a single logical element, e.g., by utilizing a suitable truth table logic implementation for a state machine design and/or the like.

The invention may comprise a method of operating a CPU that includes multiple clock zones as illustrated in FIG. 5. The method includes generating at least one power signal that is indicative of a power supply voltage within each of the clock zones as shown at 501. The method further includes adjusting a frequency of a first local clock in a first clock zone of the clock zones in response to a respective power signal from the first clock zone as shown at 503; communicating the first clock zone frequency adjustment to a second clock zone (shown at 505); and adjusting a frequency of a second local clock in the second clock zone in response to the first clock zone frequency adjustment (shown at 507).

By managing clock adjustments as discussed above, some representative embodiments may provide any of a number of advantages. In a relatively large CPU, some representative embodiments enable the response time to voltage transients to be reduced by utilizing a plurality of clock zones with respective phase controllers. Specifically, signals indicative of voltage transients may be routed relatively quickly to phase controllers. Similarly, the routing of the clocks varied under the control of the phase controllers to clock-consuming circuits in the CPU may occur relatively quickly. Therefore, the loop response time associated with the clocks is improved. By improving the loop response time, relatively small guard bands for timing issues are required and CPU performance is maximized. Likewise, worst case assumptions for analyzing timing constraints in CPU design are lessened. Moreover, some representative embodiments manage clock adjustments in a manner that maintains clock skew between zones within acceptable levels.

What is claimed is:

1. A central processing unit (CPU) that includes multiple clock zones, said CPU comprising:
   in each clock zone,
   at least one sensor that generates a power signal indicative of a power supply voltage within said clock zone;

a clock generator for providing a variable frequency clock to said clock zone; and a controller for controlling an operating frequency of said clock generator in response to said power signal and in response to frequency adjustment communications from other clock zones.

2. The CPU of claim 1 wherein said controller is operable to communicate adjustments of said operating frequency performed in response to said power signal to other clock zones.

3. The CPU of claim 2 wherein communication of said frequency adjustments requires at least one clock cycle.

4. The CPU of claim 3 wherein, when a controller in a first clock zone receives a frequency adjustment communication from a second clock zone, said controller in said first clock zone adjusts an operating frequency of a clock generator of said first clock zone to drive a phase misalignment between said first clock zone and said second clock zone to zero.

5. The CPU of claim 4 wherein said controller in said first clock zone drives a frequency misalignment between said first clock zone and said second clock zone to zero after driving said phase misalignment to zero.

6. The CPU of claim 3 wherein a controller in a first clock zone does not communicate an adjustment of an operating frequency in said first clock zone when, in an immediately previous clock cycle, said controller in said first clock zone has received a frequency adjustment communication from a second clock zone.

7. The CPU of claim 3 wherein a controller in a first clock zone does not perform a frequency adjustment in response to a frequency adjustment communication from a second clock zone when said controller in said first clock zone has performed a frequency adjustment in response to a power signal from said first clock zone in an immediately previous clock cycle.

8. The CPU of claim 1 wherein said at least one sensor is a voltage detector.

9. A method of operating a central processing unit (CPU) that comprises multiple clock zones, said method comprising:

generating at least one power signal that is indicative of a power supply voltage within each of said clock zones;

adjusting a frequency of a first local clock in a first clock zone of said clock zones in response to a respective power signal from said first clock zone;

communicating said first clock zone frequency adjustment to a second clock zone; and adjusting a frequency of a second local clock in said second clock zone in response to said first clock zone frequency adjustment.

10. The method of claim 9 wherein said communicating said first clock zone frequency adjustment requires at least one clock cycle.

11. The method of claim 10 wherein said second zone frequency adjustment comprises:

driving a phase misalignment between said first clock zone and said second clock zone to zero.

12. The method of claim 11 wherein said second zone frequency adjustment comprises:

driving a frequency misalignment between said first clock zone and said second clock zone to zero after driving the phase misalignment to zero.

13. The method of claim 10 further comprising:

receiving, at the first clock zone, a frequency adjustment communication from a third clock zone in a clock cycle immediately subsequent to said first clock zone frequency adjustment; and omitting adjustment of a frequency of a first local clock of said first clock zone in response to said third clock zone frequency adjustment.

14. A central processing unit (CPU) that includes multiple clock zones, said CPU comprising:

in each clock zone, means for generating a power signal that is indicative of a power supply voltage within said clock zone; and means for modifying a frequency of a respective variable frequency clock in response to said power signal and in response to frequency adjustment communications from other clock zones.

15. The CPU of claim 14 wherein said means for modifying a frequency communicates frequency adjustments to other clock zones.

16. The CPU of claim 15 wherein communication of frequency adjustments requires at least one clock cycle.

17. The CPU of claim 16 wherein a means for modifying a frequency in a first clock zone is operable to drive a phase misalignment between said first clock zone and a second clock zone to zero in response to a frequency adjustment communication from said second clock zone.

18. The CPU of claim 17 wherein said means for modifying in said first clock zone is operable to drive a frequency misalignment between said first clock zone and said second clock zone to zero after driving said phase misalignment to zero.

19. The CPU of claim 16 wherein a means for modifying a frequency in a first clock zone does not adjust a variable frequency clock in said first clock zone in response to a frequency adjustment communication from a second clock zone, if the second clock zone frequency adjustment communication is received in a clock cycle that is immediately subsequent to a frequency adjustment performed in said first clock zone in response to a power signal from said first clock zone.

* * * * *